Sept. 7, 1943.   A. G. MURDAUGH ET AL   2,328,991
LEG REST
Filed Oct. 29, 1941
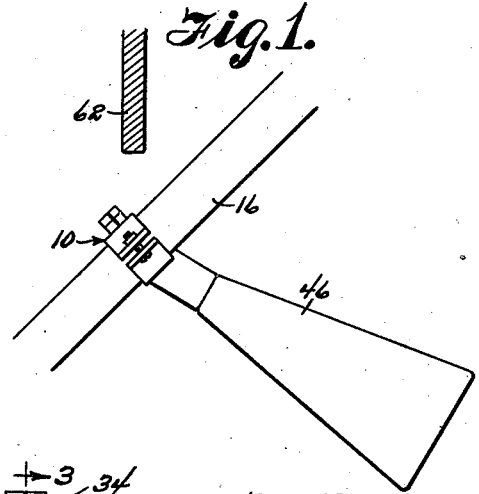
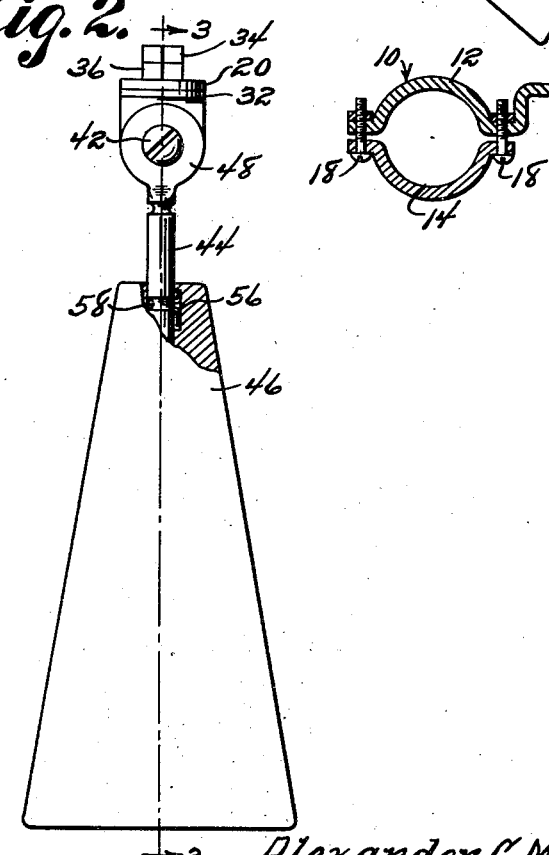
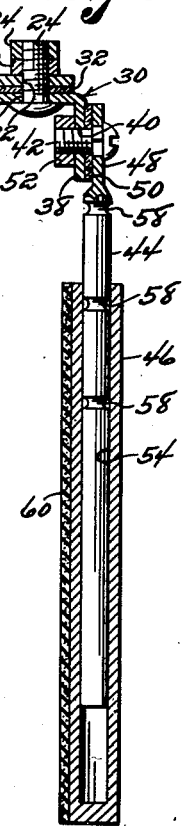
Alexander G. Murdaugh
Herschel V. Murdaugh
INVENTORS
BY Victor J. Evans & Co.
ATTORNEYS Patented Sept. 7, 1943

2,328,991

UNITED STATES PATENT OFFICE 2,328,991

LEG REST

Alexander G. Murdaugh and Herschel V. Murdaugh, Griffin, Ga.

Application October 29, 1941, Serial No. 417,032

4 Claims. (Cl. 155—165)

Our invention relates to automotive vehicles, and has among its objects and advantages the provision of an improved leg rest.

In the accompanying drawing:

Figure 1 is a view illustrating the invention applied to a steering column;

Figure 2 is a view partly in section illustrating length adjustment for the leg support; and Figure 3 is a sectional view taken along the line 3—3 of Figure 2.

In the embodiment selected for illustration, we make use of a clamp 10 comprising two curved members 12 and 14 which may be firmly clamped to the steering column 16 through tightening of the bolts 18. The contour of the clamp 10, when viewed according to Figure 3, will depend upon the specific construction of the steering column to which the leg rest is to be attached. Some steering columns are associated with an externally located gear shift rod, in which case the clamp takes the configuration accommodating such a construction. Part 12 is formed at one end of a bar-like arm 20 provided with a bore 22 for the reception of a bolt 24. This bolt extends through an opening 26 in the flange 28 of an L-shaped member 30. Between the flange 28 and the arm 20 is interposed a friction disk 32, and the bolt 24 is provided with a nut 34 between which and the arm 20 is interposed a friction washer 36.

In the flange 38 of the member 30 is provided a bore 40 for the reception of a bolt 42 on which is mounted an arm 44 to which is connected a leg-engaging member or paddle 46. Arm 44 is provided with a plate-like formation 48 having an opening for accommodating the bolt 42 and between which and the flange 38 is interposed a friction washer 50. A nut 52 on the bolt 42 engages the flange 38.

Member 46 is provided with a bore 54 which slidably receives the arm or rod 44. In Figure 2, the member 46 is provided with a spring 56 selectively engageable in recesses 58 in the rod 44 so that the member 46 may be latched to the rod in different positions by sliding the member longitudinally of the rod. A cushion of cork or other material 60 is secured to the member 46 for leg engagement.

In operation, the member 46 may be pivoted about the axis of the bolt 42 to its leg-engaging position of Figure 1 or in a clockwise direction for location underneath and forwardly of the instrument panel 62. In addition, the member 30 may be rotated about the axis of the bolt 24 which affords lateral adjustment for the rod 44. While the member 46 may be pivoted about the axis of the bolt 42 for elevation, the clamp 10 affords additional adjustment so that the member 46 may be adjusted to the most comfortable position with respect to the needs of the driver. Member 46 is rotatably mounted on the rod 44, in addition to being adjustable longitudinally thereon.

Without further elaboration, the foregoing will so fully illustrate our invention, that others may, by applying current knowledge, readily adapt the same for use under various conditions of service.

We claim:

1. A leg rest comprising an arm having a clamp for connection with a steering column of an automotive vehicle, an L-shaped member having one of its flanges frictionally pivotally connected with said arm, a rod, a frictional pivotal connection between one end of said rod and the other flange of said L-shaped member, a leg-engaging member slidable longitudinally on said rod, and means for rotatably securing the leg-engaging member to the rod in different longitudinal positions thereon.

2. The invention described in claim 1 wherein said leg-engaging member is provided with a cushioning element.

3. A leg rest comprising a clamp adapted for connection with the steering column of an automotive vehicle, said clamp including an arm, an L-shaped member, a friction washer interposed between one flange of the L-shaped member and said arm, a bolt extending through said flange, said friction washer and said arm for frictionally securing the parts, a rod arranged at right angles to said arm, a friction washer interposed between one end of said rod and the other flange of said L-shaped member, a bolt extending through said one end of the rod, said last-mentioned friction washer and said other flange for frictionally securing the parts, a leg-engaging member having a bore for slidably receiving said rod, and resilient means acting on said leg-engaging member and said rod for latching the leg-engaging member in different positions longitudinally on the rod.

4. A leg rest comprising a supporting clamp having an arm, a connecting member having angularly related first and second friction faces, said arm having a pivotal connection with said member and frictionally engaging said first face, a rod having a pivotal connection with said member and frictionally engaging said second face, a leg engaging member slidable longitudinally on said rod, and means for rotatably connecting the leg engaging member with said rod in different longitudinal positions on the latter.

ALEXANDER G. MURDAUGH.
HERSCHEL V. MURDAUGH.